United States Patent [19]

Teraoka

[11] 4,415,048

[45] Nov. 15, 1983

[54] WEIGHT MEASURING, PRICE COMPUTING AND PACKING APPARATUS

[76] Inventor: Kazuharu Teraoka, a/c Teraoka Seikosho Co., Ltd., 13-12, Kugahara 5-chome, Ota-ku, Tokyo, Japan

[21] Appl. No.: 236,721

[22] Filed: Feb. 23, 1981

[30] Foreign Application Priority Data

Feb. 26, 1980 [JP] Japan ................................. 55-23601
Oct. 21, 1980 [JP] Japan ............................... 55-147061
Oct. 30, 1980 [JP] Japan ............................... 55-152730
Oct. 30, 1980 [JP] Japan ............................... 55-152731

[51] Int. Cl.³ ..................... G01G 23/38; G01G 23/22; G01G 23/00; G01G 13/00
[52] U.S. Cl. .......................................... 177/5; 177/25; 177/245; 198/504
[58] Field of Search ................................. 177/2–13, 177/165, 25, 245; 198/504

[56] References Cited

U.S. PATENT DOCUMENTS

| | | | |
|---|---|---|---|
| 3,196,964 | 7/1965 | Allen | 177/3 |
| 3,372,079 | 3/1968 | Fellner et al. | 177/3 X |
| 3,540,971 | 11/1970 | Johanski, Jr. | 177/3 X |
| 3,650,773 | 3/1972 | Bush et al. | 177/4 X |
| 3,961,747 | 6/1976 | Small et al. | 177/4 X |
| 4,029,161 | 6/1977 | Foster et al. | 177/25 |
| 4,101,366 | 7/1978 | Teraoka et al. | 177/3 X |
| 4,229,794 | 10/1980 | Foster | 177/4 X |
| 4,276,112 | 6/1981 | French et al. | 177/4 X |

Primary Examiner—George H. Miller, Jr.
Attorney, Agent, or Firm—Sandler & Greenblum

[57] ABSTRACT

A weight measuring, price computing and packing apparatus has a weight measuring unit, a packing device for automatically packing a commodity, and a label printer. An unpacked commodity is placed on the weight measuring unit, which is located at the inlet passage of the apparatus, and the unpacked commodity is weighed there. Before the weighing operation, required data concerning the commodity is inputted into the weight measuring unit. After weighing, the weighed commodity is advanced along the inlet passage of the apparatus to the packing section, in which the weighed commodity is automatically packed. After packing, the commodity is displaced to the outlet passage of the apparatus, where the printing and labelling unit is located. The printing and labelling unit uses the measured weight and other inputted data to print a label, and then adhesively affixes the label to the packed commodity.

46 Claims, 19 Drawing Figures

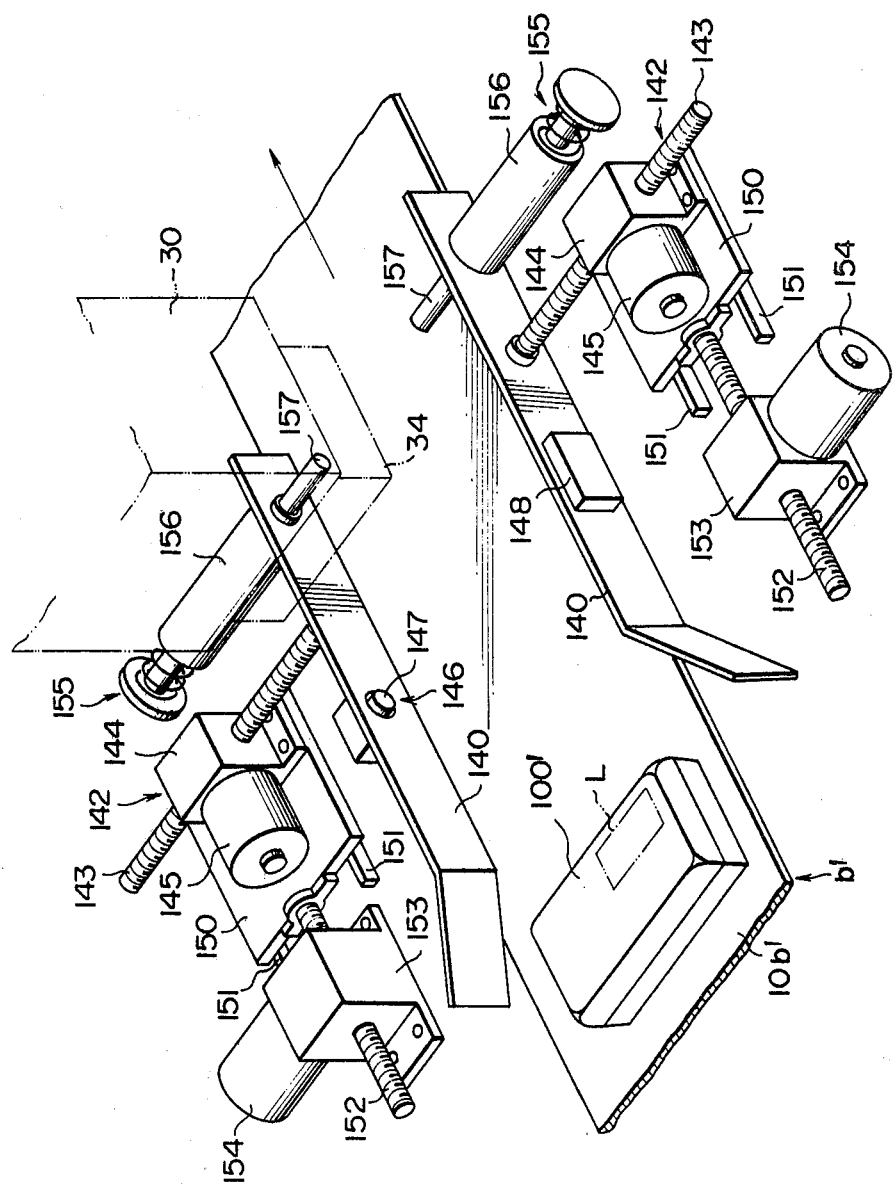

WEIGHT MEASURING, PRICE COMPUTING AND PACKING APPARATUS

BACKGROUND OF THE INVENTION

1. Field of the Invention

The present invention relates to an apparatus which comprises a commodity packing device, a weight measuring device, and a printing and labelling unit. More particularly, the apparatus relates to a combination weight measuring, price computing and packing apparatus for packing a desired commodity by conveying a commodity to a packing section through an inlet passage, automatically packing it at the packing section, and thereafter displacing the thus-packed commodity to an outlet passage where required data concerning the commodity, such as weight, unit price, selling price, data of processing, date of availability, tare weight, commodity number, bar code, and other information, are printed on a label; the printed label is then adhesively stuck on the commodity.

2. Description of the Prior Art

Known weight measuring and labelling printers or label printers normally comprise a weight measuring unit, by which the weight of a commodity is measured, and a printing mechanism, in which a printing operation is performed in accordance with input data received from the weight measuring unit. Accordingly, both the weight measuring unit and the printing mechanism are closely located or integrally built together.

When a conventional label printer is put into use with an existing commodity packing system, such as a commodity packing machine, an automatic packing line, or the like, it is necessary that the weight measuring unit and labelling printer be arranged along the outlet passage of the apparatus, which is located downstream of the commodity packing line. This is so that when the packed commodity is weighed at the label printer, required data such as unit price, commodity name, and other data will be considered. It should be noted that with conventional systems, exact weight measuring is hardly achieved, because the commodity with its packing material is weighed after completion of the packing operation.

Further, such conventional commodity packing system requires two operators, one located at the inlet passage for the purpose of transferring commodities to the packing section, and the other located by the outlet passage for operating the weight measuring and labelling printer, while considering and readjusting input data. This results in reduced operational productivity.

SUMMARY OF THE INVENTION

The first object of the present invention is to provide a weight measuring, price computing, and packing apparatus which ensures reduced manpower and improved workability and productivity by conducting a variety of operations, such as commodity displacement, weight measuring, and readjustment of input data, with a single operator. This is accomplished by conducting a series of operations, including commodity displacement, weight measuring, and readjustment of input data, only at the inlet side of the apparatus; such an arrangement results in a small apparatus, which integrally incorporates a packing machine, a label printer, and other elements.

Thus, a weight measuring, price computing and packing apparatus in accordance with the present invention comprises a weight measuring unit arranged along the inlet passage of the apparatus for the purpose of weighing a commodity, and a printing and labelling unit arranged along the outlet passage of the apparatus for printing required data on a label and for then sticking the printed label on the packed commodity. The printing section of the printing and labelling unit is connected to the weight measuring unit to permit the printing operation to be performed in accordance with the input data.

It should be noted that the commodity packing device employed in practicing the present invention is a packing machine in which a commodity is packed in a relatively narrow packing section. The commodity is packed with the use of a so-called stretch film, which has excellent characteristics, and by an automatic packing device in which the commodity is packed during movement through a packing line which comprises a packing section or like device.

Usually, a label is used as display means, on which all or part of relevant data such as unit price, weight, selling price, date of processing, date of availability, tare weight, commodity name, bar code, and other data are printed. Alternatively, the label may be a price tag, on which just the selling price is printed, or may include a part on which a shop name and other data are preliminarily printed.

The weight measuring unit comprises a weight measuring section and an input control section, on which unit price, date of processing, date of availability, and other data are considered and controlled in the input control section, while the commodity weight and price are inputted into the weight measuring section.

Among the data to be printed on a label, as listed above, is the commodity name, which may be prepared by exchanging rubber stamps or like apparatus in the printing section. In cases where the commodity name is less frequently exchanged, particularly where a large number of commodities are packed with a single commodity name, or in cases which previously printed labels are used, little trouble occurs. However, in cases in which the commodity name changes every time a group of commodities are packed, the operator is required to walk to the printing section located at the outlet passage in order to perform commodity name exchanging operations. This results in inefficient operation.

The second object of the present invention is to provide a weight measuring, price computing, and packing apparatus which ensures further improved workability by inputting commodity name data into the weight measuring unit, the commodity name data having previously been exchanged in the printing section. To accomplish this, the weight measuring, price computing, and packing apparatus of the present invention has a commodity name input means on the weight measuring unit, so that a specific commodity name will be printed on a label, together with other data, in accordance with input data in the commodity name input means of the printing section of the printing and labelling unit.

Specifically, the commodity name input means is constructed so that a cassette with the commodity name contained therein is removably inserted in an opening of the weight measuring unit, and the required commodity name is optically read from the inserted cassette and transmitted to the printing section. In another system, ten keys on the input control section are operated to electrically call up the required commodity name via a typing operation.

A commodity can be displaced from the weight measuring unit onto the inlet passage of the packing section by having an operator place the commodity onto the inlet passage by hand. However, it is preferable if the commodity is automatically transferred onto the inlet passage from the weight measuring section, after a certain period of time has elapsed after weighing is completed.

The third object of the present invention is to provide a weight measuring, price computing and packing apparatus which achieves successive packing operations with improved workability by automatically transferring the commodity onto the inlet passage after completion of weighing at the weight measuring unit. To accomplish this, the weight measuring, price computing, and packing apparatus of the present invention has a mechanical conveying means for transferring the weighed commodity onto the inlet passage. The mechanical conveying means is adapted to be operated in association with the weight measuring operation of the weight measuring unit.

The mechanical conveying means comprises a commodity conveying device, such as a pusher, which is adapted to reciprocally move or turn with respect to a belt conveyor or like device, incorporated in the weight measuring section, in order to convey the commodity to the inlet passage beyond the weight measuring section of the weight measuring unit. The commodity conveying device operates in association with the weight measuring operation of the weight measuring section when a weight measuring operation completion signal, such as a weight measuring stabilizing signal, computing operation completion signal, or like signal, is issued.

The packing section of the apparatus has limitations with regards to dimensions of a commodity to be packed, such as height, length, or the like. When a commodity has dimensions in excess of the scope of the limitations described above, it is only necessary to weigh the package and place a label thereon without effecting a packing operation. However, since the apparatus automatically and successively effects both packing and label sticking in association with weight measuring, there is a danger of causing malfunctions of the apparatus in such circumstances.

If only weight measuring was required to be effected for a given commodity, using the weight measuring section, it could not be utilized, as it is incorporated in the combined apparatus.

Further, in cases in which a commodity is to be weighed and is in excess of the scope of the weight measuring section, the apparatus would fail to initiate packing, label printing, and other operations. As a result, no price computing and packing would be effected on the commodity.

The fourth object of the present invention is to provide a weight measuring, price computing and packing apparatus which has excellent versatility and workability, without the drawbacks described above. To accomplish this, the weight measuring, price computing, and packing apparatus of the present invention is characterized by the fact that one or more weight measuring sections are arranged separately, in addition to the weight measuring section in the weight measuring unit, and a switching means is provided for switching operation to any of these weight measuring sections. The measuring section to which operations are switched then undertakes all or part of the given functions, such as weight measuring, computing, packing, label printing, and label sticking.

Electronically operated scales are employed for the weight measuring sections. The scales have the same weighing range as that of the weight measuring section in the weight measuring unit, or the scales have a weighing range in excess of the preset weighing range of the weight measuring unit.

The weight measuring sections to which operations may be switched are located in the vicinity of the main weight measuring section and/or in the vicinity of the printing and labelling unit.

The switching means is constructed in the form of a circuit or device with a switch or like device incorporated therein. More particularly, a switch for the purpose of switching operations is fitted in the input control section, so as to switching operation to any of the weight measuring sections. Alternatively, the input control section or the printing and labelling unit is constructed in such a manner so as to swing at a certain angle, so that the swinging portion constitutes a switch.

When a plurality of weight measuring sections are used, it is preferable that the switching circuits be put into use in an allocated order of priority.

As long as the weight measuring sections to which operations may be switched are in use, it is unnecessary for the apparatus to undertake all of the functions described above. It may perform only a part of them, for instance, only weight measuring, or only weight measuring and label preparing, or only weight measuring, label printing, and label sticking.

The weight measuring section of the weight measuring unit is constructed in such a way that, for tare weight subtraction, a prohibited range exists in which no operating signal can be issued to motivate the commodity conveying device, irrespective of any weight measuring operation completion signal issued, insofar as small weight values are concerned (e.g., 20 g. or 0.20 lbs.). However, when the tare weight exceeds the prohibited range, an operating signal is outputted whereby the conveying operation of the commodity conveying device, the packing operation of the packing section, and/or the label sticking operation of the printing and labelling unit are initiated prior to weighing the commodity; in other words, the operating signal is outputted when measuring the tare weight. Thus, there is a danger of causing malfunctions, such as the useless operation of packing only a tare, memory addition, label preparation, and others.

The fifth object of the present invention is to provide a weight measuring, price computing and packing apparatus which achieves perfect prevention of malfunctions, such as useless operation of packing only a tare, label preparation, and others, and which ensures excellent workability and maneuverability. To accomplish this object, the weight measuring, price computing, and packing apparatus of the present invention includes a switch section in the input control section of the weight measuring unit for prohibiting any output of the operating signal by the control mechanism or other devices so that any conveying operation of the printing and labelling unit or packing section will be prohibited by operating the switch section when measuring the tare weight or the like.

Release from the prohibited condition of the switch section, as described above, may be effected by the manual operation of returning the switch to the original position, by the manual operation of depressing a momentary switch twice, or in accordance with the operation of an automatic system in which a weight measuring stabilizing signal is employed to measure the tare weight or the like.

As described above, the apparatus is provided with a printing and labelling unit in which a label is printed and the printed label is automatically stuck onto a packed commodity. For the purpose of label sticking, a mechanical system in which a plunger is operated or an air stream is blown is usually employed.

In the case of the former system, where a plunger is mechanically operated, there is a danger that a printed label will be adhesively stuck to a wrong location because of the configuration of the packed commodity. This is due to the fact that the plunger has a substantially constant stroke until it reaches the position where the label is to be stuck, and is especially a problem when the commodity concerned fluctuates in height. Also, undesirable deformation takes place within the packed commodity due to increased depressing force imparted by the plunger, especially when the commodity has an excessive height. On the other hand, in the case of the latter-mentioned air stream system, malfunctions can occur, such as uneven label sticking caused by differences in label sticking force, sticking the label in a wrong position, and others. This is especially the case when the commodity concerned fluctuates in height, because the printed label is blown down from a constant height.

The sixth object of the present invention is to provide a weight measuring, price computing, and packing apparatus which is entirely free of the drawbacks described above. To accomplish this, the weight measuring, price computing, and packing apparatus of the present invention automatically detects the height of a commodity relative to a reference face, and alerts the printing and labelling unit, which is automatically corrected relative to its location in the vertical direction. Thereby, the printed label is adhesively stuck at a constant distance at all times, with less of a change of causing incorrect label sticking, and the printed label is stuck exactly at a predetermined location.

The seventh object of the present invention is to provide a weight measuring, price computing, and packing apparatus which ensures exact and correct label sticking at a predetermined position on a packed commodity. To accomplish this, the weight measuring, price computing, and packing apparatus of the present invention has a pair of guide plates arranged along the outlet passage of the apparatus behind the packing section and in opposed spaced relation to it, in order to correctly locate the packed commodity in the transverse direction relative to the outlet passage. This allows the commodity to come into contact with one of the guide plates, while a sensor detects the movement of the packed commodity, so that the printing and labelling unit is operated when a certain period of time elapses after the detecting signal is issued.

The eighth object of the present invention is to provide a weight measuring, price computing, and packing apparatus which ensures exact and correct label sticking by temporarily stopping the commodity only during the movement through the guide plates.

The printing and labelling unit is constructed with a totalling memory which performs an addition operation by adding required commodity data transferred thereto, such as weight, price, and number of packed commodities, in an itemwise manner. Conventional label printers are designed so that the totalling memory would perform the addition operation at the same time that the printing operation is effected. However, if a conventional label printer is applied to the apparatus of the present invention as is, a label, in order to be adhesively stuck, is prepared by the printing and labelling unit, and then the content of the printed label added to the totalling memory. Even when no commodity stays in the label sticking position due to some abnormality of the apparatus, for instance, stoppage of a commodity, missing during the conveyance of the same, or the like, the printed label is added to the totalling memory. This requires that added useless data be checked and corrected in order to amend or modify the totalling memory.

The ninth object of the present invention is to provide a weight measuring, price computing, and packing apparatus which is entirely free of the drawbacks described above. To accomplish this, the weight measuring, price computing, and packing apparatus of the present invention is characterized by the fact that when no packed commodity stays in the predetermined label sticking position, the totalling memory is prohibited from performing any addition operation, irrespective of motivation from the printing and label sticking operation. As a result, improved totalling accuracy and workability are ensured for the printing and labelling unit.

The tenth object of the present invention is to provide a weight measuring, price computing, and packing apparatus which ensures further improved totalling accuracy and workability by prohibiting the addition operation of the totalling memory, even when no printed label is prepared in the predetermined position on the printing and labelling unit due to erroneous displacement of the printed label or the like malfunction.

BRIEF DESCRIPTION OF THE DRAWINGS

The present invention will now be described in more detail with reference to the accompanying drawings, which illustrate preferred embodiments of the invention, and in which:

FIG. 19 is a perspective view of a labelling means in accordance with a modified embodiment of the invention.

DETAILED DESCRIPTION OF THE PREFERRED EMBODIMENTS OF THE INVENTION

Figure 1:
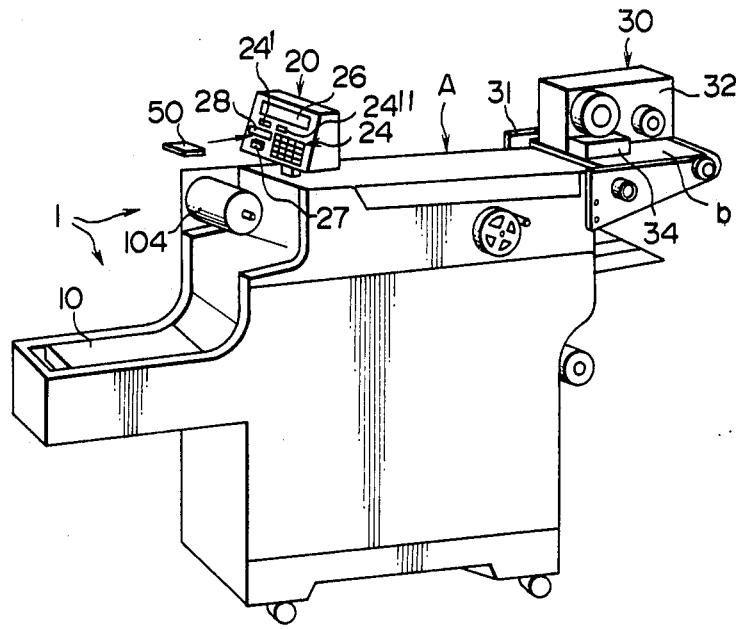
FIG. 1 is a perspective view of a weight measuring, price computing, and packing apparatus in accordance with the present invention.
Figure 2:
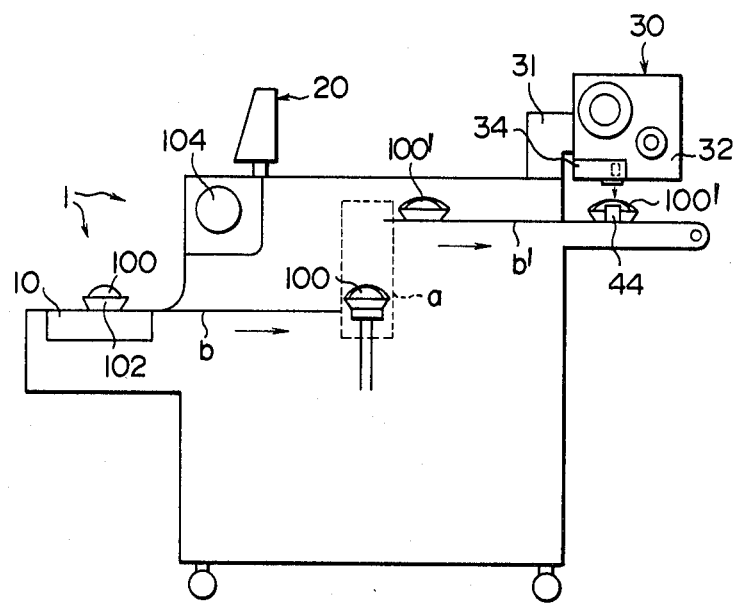
FIG. 2 is a vertical sectional view of the apparatus of FIG. 1, schematically illustrating the process of operation thereof.
Figure 3:
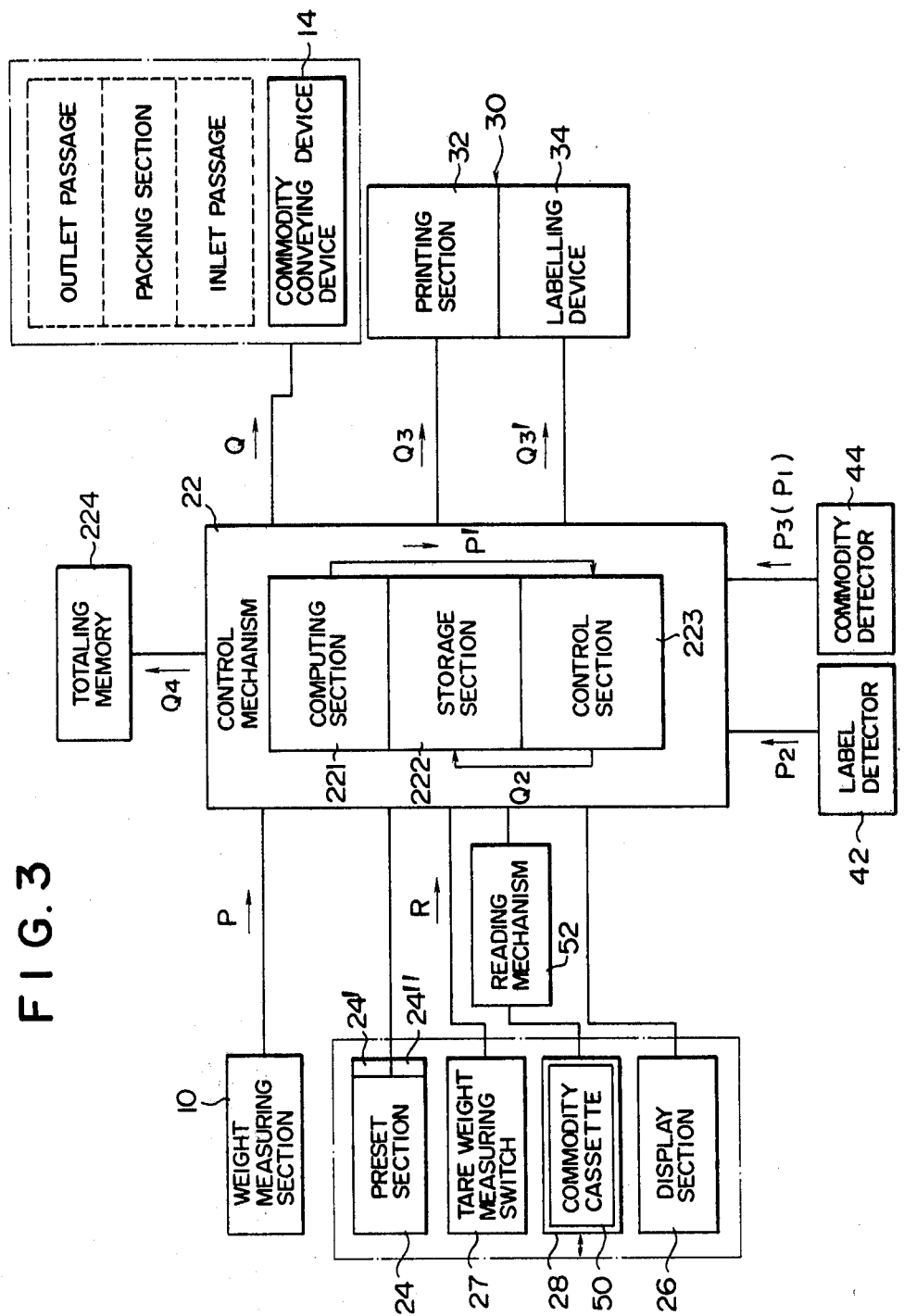
FIG. 3 is a block diagram of the apparatus of FIG. 1.

Referring to FIGS. 1-3, in which an apparatus is designated by reference symbol A, reference symbol a designates a packing section, reference signal b designates a commodity inlet passage, and reference symbol b' designates a packed commodity outlet passage. Reference numeral 1 designates a weight measuring unit, and reference numeral 30 designates a printing and labelling unit.

Packing section a is constructed such that commodity 100 is conveyed by way of inlet passage b, and automatically packed in stretchable film 104 to form packed commodity 100', which is then automatically taken out by way of outlet passage b'. In the drawing, commodity 100 is shown moving through the apparatus while being carried on tray 102.

The floors of inlet passage b and outlet passage b' are in the form of conveyor belts. Inlet passage b extends between weight measuring section 10 of weight measuring unit 1 and packing section a. Outlet passage b' extends between packing section a and printing and labelling unit 30.

Weight measuring unit 1 essentially comprises weight measuring section 10 and input control section 20, the input control section 20 having control mechanism 22 incorporated therein and connected to weight measuring section 10, packing section a, and printing and labelling unit 30, respectively, in order to control their operations. Weight measuring section 10 is intended to measure the weight of commodity 100 on scale tray 102 and its data concerning the weight of the respective commodity is converted into a specific electrical signal, which is in turn transferred as an input to control mechanism 22. Further, as weight measuring becomes stabilized, a weight measuring stabilizing signal P is transmitted therefrom, and may be transmitted directly from weight measuring section 10, or may be transmitted in the form of an output from computing section 221 in control mechanism 22, which is adapted to operate in accordance with the given weight data.

After completion of weighing on weight measuring section 10, commodity 100 is displaced onto commodity inlet passage b by the operator, or is displaced mechanically and automatically by a pusher, which is designed to extend over weight measuring section 10 and along inlet passage b, or by conveying means 14 such as a belt conveyor or the like incorporated in weight measuring section 10.

In case the displacement of the commodity is effected by means of the last-mentioned automatic mechanical conveying means 14, conveying means 14 is actuated by control mechanism 22 when weight measuring stabilizing signal P is issued, whereby commodity 100 is displaced along inlet passage b.

In the meantime, input control section 20 contains control mechanism 22, incorporated therein, and also has number keys (ten) and other input keys, a power switch, and other controls arranged on the surface of input control section 20 so that required commodity data, such as commodity name, commodity code number, unit price, date of manufacture of commodity concerned, expiration date of availability of the commodity, tare weight, bar code number, and other data, are supplied to control mechanism 22 in the form of an input. Further, input control section 20 contains preset section 24 and display section 26, in which data such as unit price, weight, price, and other data are displayed in a digital manner. Preset section 24 is adapted to cause the above-mentioned commodity data to pass through to control mechanism 22 via operation of the appropriate keys.

It is to be noted that in input control section 20, reference numeral 27 designates a tare weight measuring switch, reference numeral 28 designates an opening through which a commodity name cassette is inserted, reference numeral 24' designates an automatic conveying switch in case conveying device 14 is in use, and reference numeral 24'' designates a manual conveying switch in case the conveying device is not in use.

Control mechanism 22 essentially comprises computing section 221, in which data concerning commodity weight supplied from weight measuring section 10, and data concerning the unit price of the commodity, supplied from preset section 24, are processed to compute a selling price; storage section 222, in which data concerning commodities and prices are stored; and control section 223, from which operation command signals are issued to conveying device 14, printing and labelling unit 30, and others. Further, totalling memory 224 is connected to control mechanism 22, or is incorporated in the same.

A variety of commodity data stored in storage section 222 are selectively transferred to printing and labelling unit 30 when a specific packed commodity 100' is detected by means of a commodity detector, which will be described later.

Figure 4:
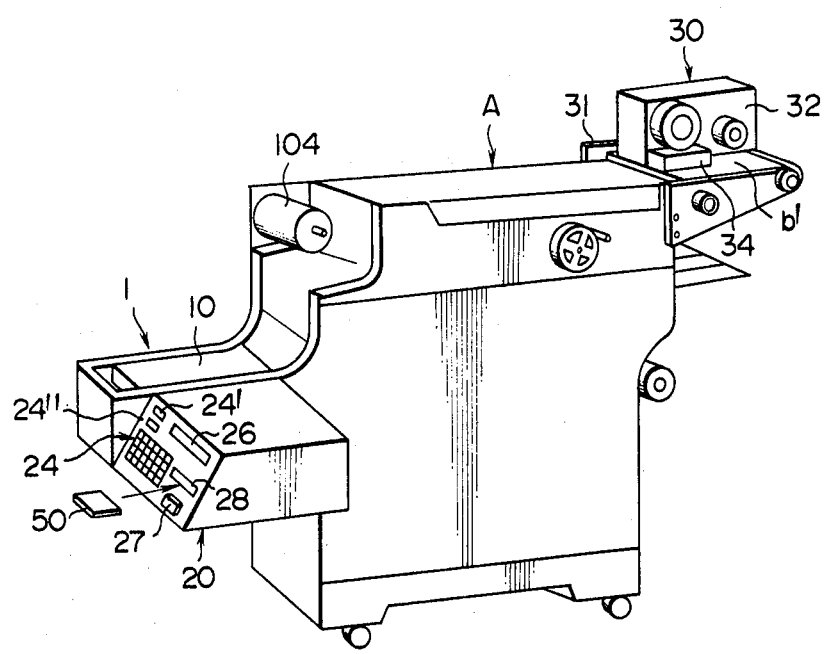
FIG. 4 is a perspective view of a weight measuring, price computing, and packing apparatus in accordance with a modified embodiment of the present invention.
Figure 5:
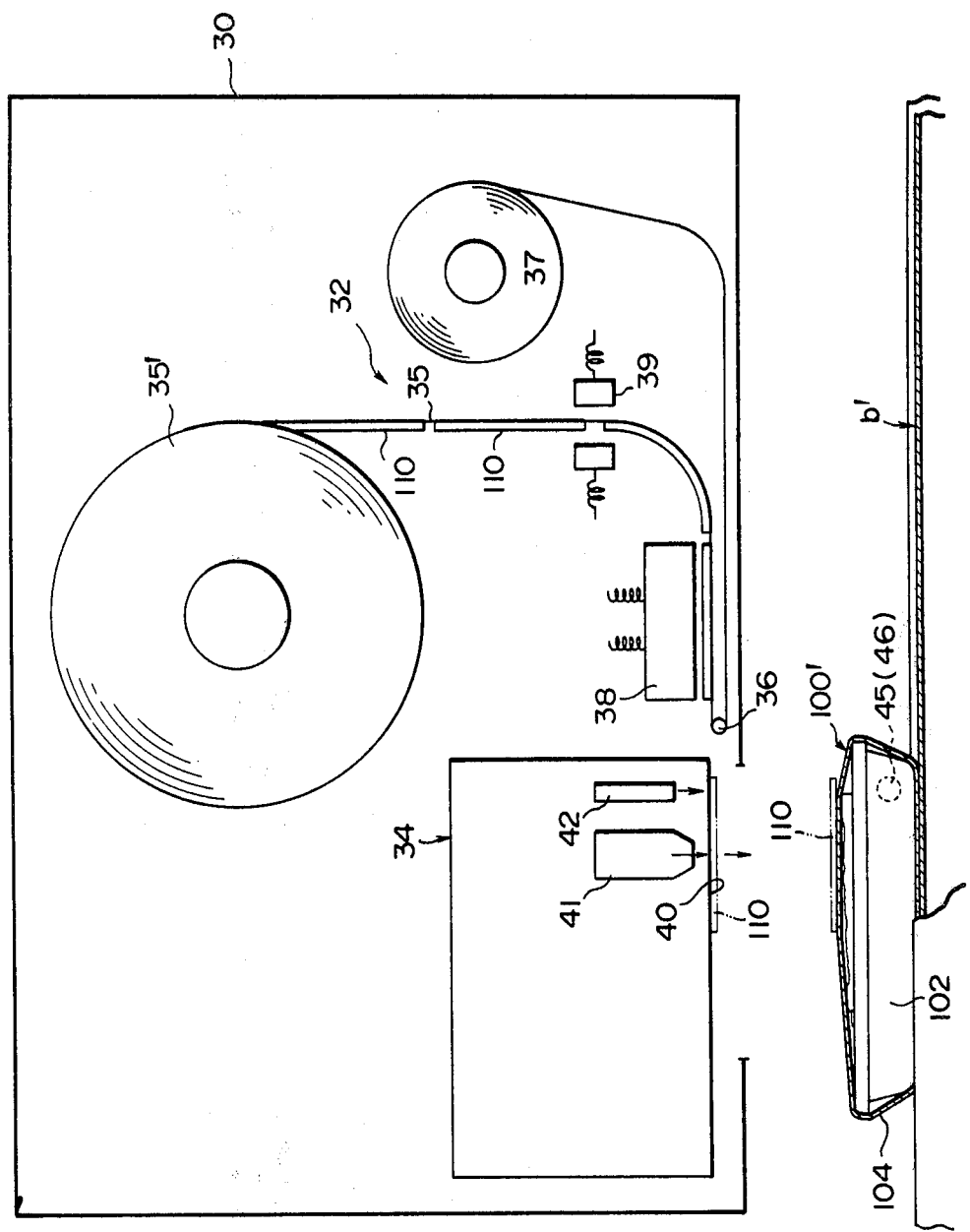
FIG. 5 is a vertical sectional view of a printing and labelling unit of the apparatus, shown in an enlarged scale.

Input control section 20 is mounted on the upper surface of apparatus A in the vicinity of weight measuring section 10 (see FIGS. 1 and 2). Alternatively, it may be located by weight measuring section 10 and parallel thereto, as illustrated in FIG. 4.

Printing and labelling unit 30 comprises a label printer which is fixedly mounted in position about outlet passage b', with the aid of support frames 31. The label printer essentially comprises printing section 32 and automatic labelling device 34. Printing section 32 is constructed in such a manner that a strip of label base paper 35, with a number of equally spaced labels 110 removably adhered thereto, is intermittently unreeled from base paper roll 35'. Label base paper 35 passes through dispenser 36, and is received around reeling roll 37. Printing head 38 and label position detector 39 are arranged along the path to reeling roll 37.

Further, printing section 32 is constructed such that, when certain required commodity data stored in storage section 222 of control mechanism 22 are transferred in accordance with a printing command signal issued from control section 223, label 110 is printed by printing head 38, printed label 110 is automatically peeled off from label base paper 35 when label base paper 35 begins to move in reverse at dispenser 36 and toward reeling roll 37, and then label 110 is displaced below adhesive sticking device 34.

Printing head 38 may comprise any dot print-type printing heads, such as a conventional wire dot-type printing head, a thermal head, or the like.

Adhesive sticking device 34 is located in the vicinity of dispenser 36 in such a manner that its height is adjusted in the vertical direction, as required. Further, it has suction surface 40 at its bottom, through which air is sucked by a reduced pressure caused by means of a fan (not shown), and is also equipped with sticking nozzle 41, which is designed to blow an air flow for a certain period of time with force in excess of the suction force generated by the reduced pressure.

Adhesive sticking device 34 is constructed such that printed label 110 is displaced from printing section 32; it is held below suction surface 40 and is then adhesively stuck onto packed commodity 100' by blowing air from nozzle 41 in the downward direction, in accordance with a label sticking command signal issued by control mechanism 22.

Further, adhesive sticking device 34 is equipped with label detector 42 in the vicinity of sticking nozzle 41. Label detector 42 is intended to optically detect whether printed label 110 is held below suction surface 40. Specifically, label detector 42 is adapted to check the existence of printed label 110 in adhesive sticking device 34 and transmit label detecting signal $P_2$ to control mechanism 22 when recognizing the existence of printed label 110.

Figure 6:
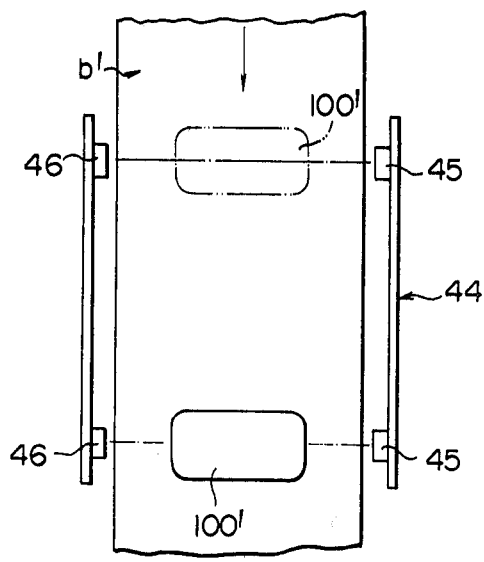
FIGS. 6 and 7 are top plan views of commodity detecting means in accordance with modified embodiments of the invention.
Figure 7:
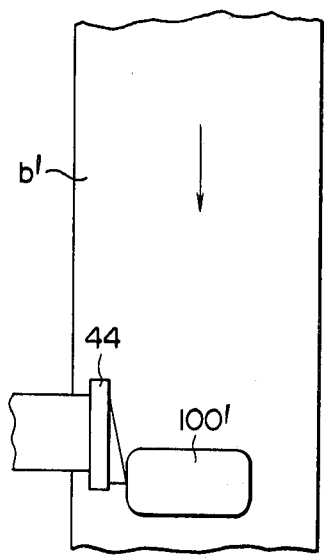

As illustrated in FIGS. 6 and 7, below adhesive sticking device 34 and on outlet passage b'; a set of commodity detectors 44 are arranged which detect the existence of packed commodity 100', commodity detectors 44 being connected to control mechanism 22.

In FIG. 6, commodity detector 44 is designed as a photoelectric detecting system, comprising light transmitter 45 and light receiver 46. When packed commodity 100' reaches commodity detector 44 below adhesive sticking device 34, it is effective in detecting the existence of packed commodity 100', and commodity signal $P_3$ is thereby transmitted to control mechanism 22.

As illustrated in FIG. 6, commodity detector 44 may be constructed of plural sets of light transmitters 45 and light receivers 46 so that packed commodity 100' can be detected and located in a predetermined area. Alternatively, it may be replaced by a mechanical switch which is operated by contact against packed commodity 100', as illustrated in FIG. 7.

Control mechanism 22 is such that, upon receipt of weight measuring stabilizing signal P from weight measuring section 10, operation signal Q is issued from control section 223 to actuate commodity conveying device 14; on receipt of commodity detecting signal $P_3$ from commodity detector 44, operating signal $Q_2$ is issued from control section 223 to storage section 222 to transfer required commodity data from storage section 222 to printing section 32; and operating signals $Q_3$ and $Q_3'$ are issued to printing and labelling unit 30 to carry out printing and sticking operations on label 110.

Further, control mechanism 22 is such that, on receipt of both label detecting signal $P_2$ and commodity detecting signal $P_3$, operating signal $Q_4$ is issued from control section 223 to effect the memory addition operation in totalling memory 224. The memory addition operation is effected in such a manner that total weight, price, and the number of commodities to be transferred from storage section 222 to printing section 32 are itemwise calculated.

The actuating operation of packing section a may be controlled by control mechanism 22, or, alternatively, may be effected in synchronization with control mechanism 22 by providing a separate control mechanism for packing section a.

Operation of apparatus A will now be described in greater detail, as follows.

First, an operator starts apparatus A, and then inputs various data concerning a commodity 100 to be measured, such as unit price, date of manufacture, expiration date of availability, bar code data, and other data to control mechanism 22 by operating keys on preset section 24 of input control section 20 in weight measuring unit 1, whereby the data are stored in storage section 222. Then he places commodity 100 on weight measuring section 10, commodity 100 being located in tray 102, and data concerning the weight of commodity 100 is thereby transmitted into computing section 221 of control mechanism 22, in which a price is processed and computed on the basis of the weight data with reference to data concerning unit price. As a result, the respective data are displayed on display section 26. Further, when it is confirmed that a measurement has stabilized, measuring stabilizing signal P is transmitted into control mechanism 22, and at the same time current price data are stored in storage section 222. Thus, display section 26 achieves a stable display, and, as a result, it is maintained at a constant value.

On receipt of the output of weight measuring stabilizing signal P, control section 223 causes commodity conveying device 14 to be actuated so that measured commodity 100 is automatically displaced from weight measuring section 10 onto inlet passage b, and is then delivered to packing section a by means of the conveyor belt in inlet passage b.

Afterwards, other commodities 100 are successively weighed in weight measuring section 10 in the same manner as the first commodity, and their data are stored in the correct order in storage section 222 of control mechanism 22.

Commodity 100 is delivered to packing section a, and is automatically packed in stretchable film 104 by the packing mechanism; thereafter, packed commodity 100' is displaced onto outlet passage b'. Then it is transferred below printing and labelling unit 30 with the aid of the belt conveyor in outlet passage b'.

When packed commodity 100' is delivered to the predetermined position below labelling device 34, it is detected by commodity detector 44, and commodity detecting signal $P_3$ is released from commodity detector 44, causing the belt conveyor in outlet passage b' to come to a temporary stop. At the same time, operating signal $Q_2$ is supplied into storage section 222 of control mechanism 22 so that the required data concerning the commodity concerned are delivered to printing section 32, and on receipt of operating signal $Q_3$, printing section 32 prints the delivered data on label 110. Then printed label 110 is displaced to adhesive sticking device 34, and is thereafter stuck to the upper surface of packed commodity 100' by an air stream blown from nozzle 41 in adhesive sticking device 34, packed commodity 100' being stationarily located just below printed label 110.

While printed label 110 is displaced to adhesive sticking device 34 and held on suction surface 40, its existence is detected by means of label detector 42. Then, when detecting signal $P_2$ is inputted into control mechanism 22, together with commodity detecting signal $P_3$, totalling memory 224 performs a memory addition operation in accordance with operating signal $Q_4$.

During operation of the above-described process, data transfer from storage section 222, as well as motivation of the printing operation in printing section 32, are initiated by output of commodity detecting signal $P_3$ from commodity detector 44. The process is constructed so that control section 223 outputs both operating signals $Q_2$ and $Q_3$ by input of commodity detecting signal $P_3$, but alternatively, operating signals $Q_2$ and $Q_3$ may be outputted by input of weight measuring stabilizing signal P. Namely, the process may be so constructed that storage section 222 successively stores data concerning a plurality of commodities (for instance, four pieces). Further, weight measuring stabilizing signal P causes the foremost data of storage section 222 (the data concerning the commodity which is located at the packing section or the output passage) to be shifted and transferred to printing section 32, in which label 110 is printed and held on suction surface 40 of adhesive sticking device 34. Then, when packed commodity 100' is detected by commodity detector 44, the label sticking operation is performed by means of an air jet from nozzle 41, which is motivated by operating signal $Q_3$.

Thus, it is ensured that there is no need for packed commodity 100' to come to a stop at the label sticking position (the conveyor in the outlet passage comes to a stop) or, if it does stop, the period of stoppage is reduced, resulting in operation at a higher speed.

Further, in an alternate embodiment, the period of time for data transfer from storage section 222 for conveying device 14 to be motivated may be such that computing section 221 calculates a price on the basis of the weight data transmitted, together with weight measuring stabilizing signal P, and control section 223 outputs operating signals $Q_2$ and $Q_3$ by the input of calculation completion signal P', which is outputted after completion of calculation.

Moreover, during operation of the aforesaid process, operating signal $Q_4$, by which totalling memory 224 is operated, is adapted to output by the input of both label detecting signal $P_2$ and commodity detecting signal $P_3$, but in case that data transfer and printing operations are performed by the output of weight measuring stabilizing signal P, as described above, operating signal $Q_4$ of totalling memory 224 outputs only by commodity detecting signal $P_3$.

It is obvious, however, that operating signal $Q_4$ may output by both detecting signals $P_2$ and $P_3$.

Because totalling memory 224 is operated in the above-described manner, there is no possibility that memory addition is performed immediately after data is transferred from storage section 222. Thus, it is ensured that no memory addition is performed until label 110 is correctly stuck onto packed commodity 100', without any trouble, during movement of the packed commodity and any wrong displacement of the label; thereby, addition of unnecessary data is effectively prevented, wrong values are excluded from the totalling memory, and, as a result, correct totalling data are achieved.

It is to be noted that when control section 223 in control mechanism 22 fails to output operating signal $Q_4$ to totalling memory 224, an alarm buzzer, lamp, or other alarm means may be actuated so that the operator recognizes the existence of the abnormal condition, or, alternatively, printing and labelling unit 30 may come to a stop.

Next, the present invention will be described below with respect to the case in which input control section 22 in apparatus A is provided with an input means by which commodity names are inputted.

The commodity name input means essentially comprises commodity name cassette 50, adapted to be inserted into cassette insert opening 28, and film pattern reading mechanism 52, by means of which commodity names marked in the inserted cassette can be optically read.

Typically, film pattern reading mechanism 52 comprises a light source, located in position above inserted cassette 50, and a photoelectrical converter adapted to receive reflected light from the printed surface of cassette 50, the photoelectrical converter being connected to control mechanism 22.

When cassette 50 is inserted into insert opening 28, the photoelectrical converter becomes effective in receiving the reflected light from the printed surface of cassette 50, on which a specific commodity name is marked. Then, the received darkness pattern is converted into electrical signals, which are in turn delivered to control mechanism 22 to be stored in storage section 222, together with other input data. Additionally, the stored data are transmitted into printing section 32 by way of data transfer, so that the data are printed on label 110.

The commodity name input means may be constructed in alternate embodiments. One embodiment uses numeral keys in preset section 24 of input control section 20, which are put into use in such a manner that a predetermined number corresponding to the commodity name concerned is called up by keying in the number, and then the commodity name is inputted into storage section 222; in another embodiment, the commodity name keys, with specific commodity names marked thereon, are arranged in preset section 24, and the required commodity name is inputted by way of a typing operation.

Figure 8:
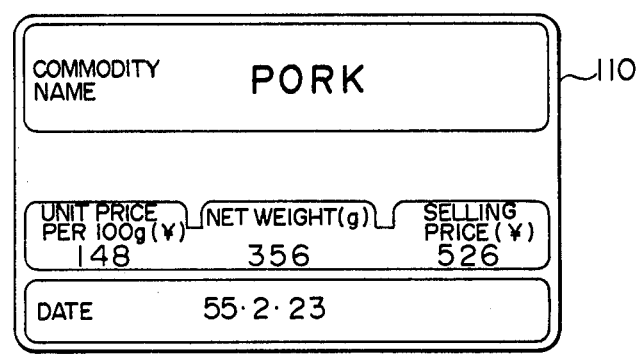
FIG. 8 is a front view of a sample printed label.

An example of printed label 110 is illustrated in FIG. 8.

Next, tare weight measuring switch 27, disposed in preset section 24 of input control section 20, will be described below.

Tare weight measuring switch 27 is connected to control section 223 in control mechanism 22. When tare weight measuring switch 27 is turned on, prohibit signal R is outputted to control section 223, whereby the output of operating signals Q, $Q_2$, and $Q_3$ are issued from control section 223 and are kept in a prohibited condition. On the other hand, when tare weight measuring switch 27 is turned off, the tare weight subtraction operation is initiated. Specifically, data concerning the tare weight obtained at weight measuring section 10 are inputted into storage section 222, and at the same time prohibit signal R is released. Alternatively, prohibit signal R may be automatically released with the aid of weight measuring stabilizing signal P, issued from weight measuring section 10, during the measuring of the tare weight. In this case, the tare weight subtraction operation is performed when weight measuring stabilizing signal P, from weight measuring section 10, is inputted into control section 223, and at the same time prohibit signal R is automatically released.

Further, by modifying the interior arrangement of tare weight measuring switch 27, it is possible for switch 27 to serve as a conventional tare key.

Figure 9:
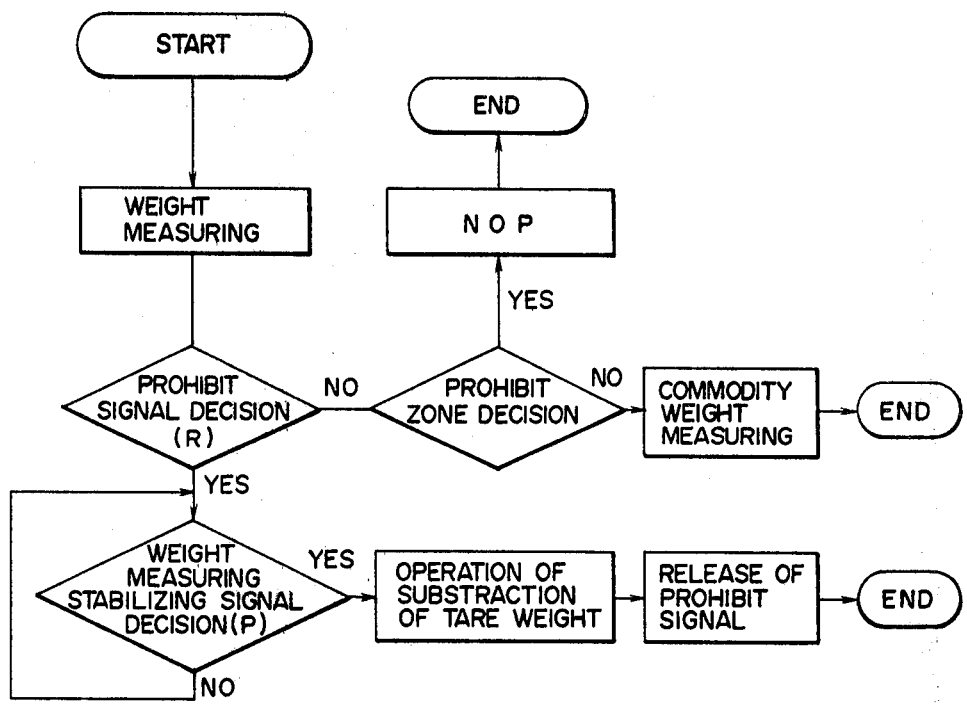
FIG. 9 is a flow chart illustrating operation of the apparatus during weight measuring of a tare.

The tare weight measuring operation will now be described with reference to the flow chart in FIG. 9, which illustrates an example of the tare weight measuring operation.

When tare weight measuring switch 27 is turned on, and measuring then effected with tray 102 placed on weight measuring section 10, weight data are inputted in control mechanism 22. However, due to the existence of prohibit signal R, operating signals Q, $Q_2$, and $Q_3$ fail to be outputted, even though weight measuring signal P is outputted in excess of the range of the predetermined small weight measuring value (for instance, 20 g.). Thus, on receipt of the input of weight measuring stabilizing signal P, the intended tare weight subtraction operation is performed, during which the data concerning the weight of tray 102 are stored in storage section 222, and at the same time, prohibit signal R is automatically released.

Since prohibition of the output of operating signal Q prevents conveying device 14 from being motivated, it follows that tray 102 is kept in place on weight measuring section 10. Thus, it is unnecessary to uselessly pack tray 102. Further, the prohibition of the output of operating signals $Q_2$ and $Q_3$ causes both data transfer and the printing operation to be prevented from operation. Therefore, when weight measuring is later performed on commodity 100, placed on tray 102, conveying device 14 starts operating upon receipt of the output of weight measuring stabilizing signal P; automatic packing, label printing, and adhesive sticking steps are performed for the commodity concerned as described above.

Even in the case where tray 102 is placed on weight measuring section 10, without tare weight measuring switch 27 being turned on, no further operation is effected (NOP), as long as the tray weight is kept within the prohibited range below the predetermined value; the tare weight subtraction operation is performed by way of the step of depressing the tare key. Then, when placing the commodity on tray 102, the operation is performed in accordance with the process steps as described above, after weight measuring stabilizing signal P is outputted.

Figure 10:
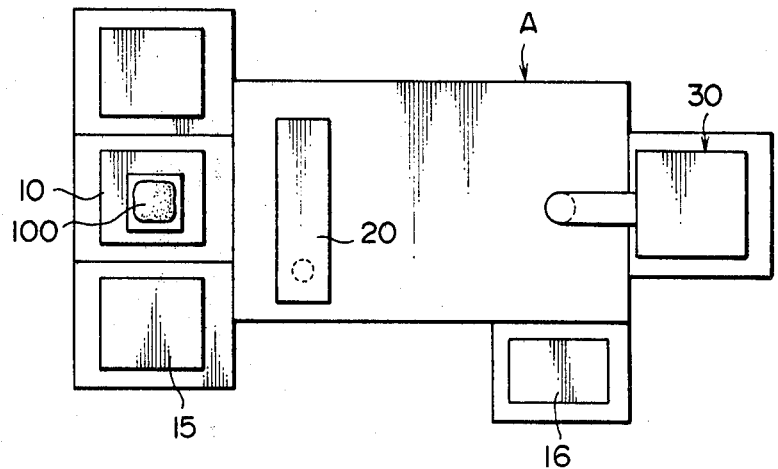
FIG. 10 is a plan view of the apparatus in which the weight measuring unit is constructed in accordance with a modified embodiment of the invention.
Figure 11:
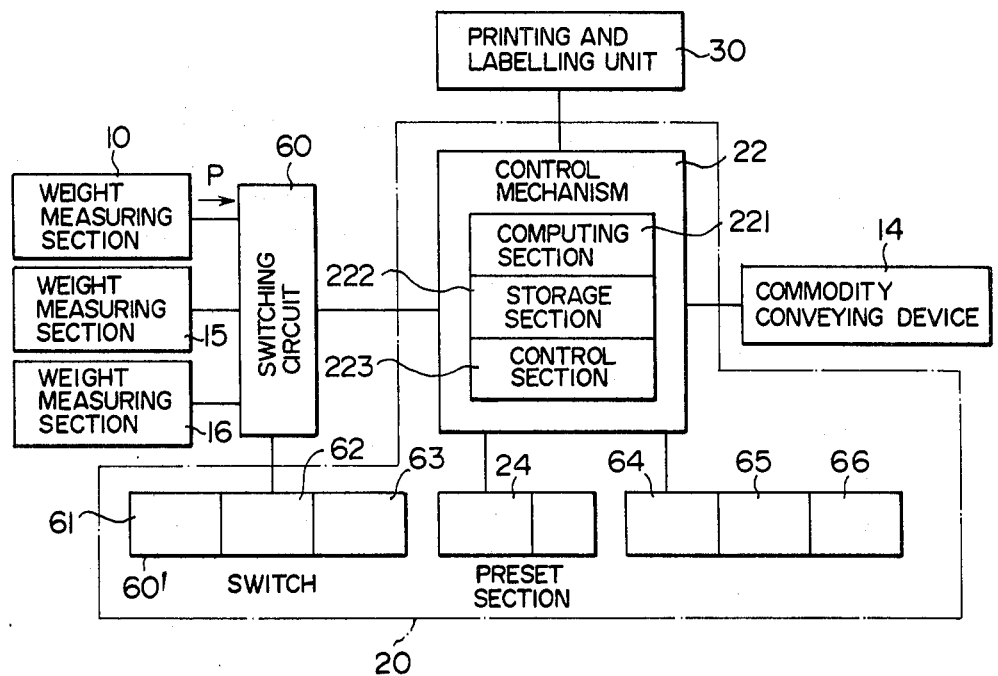
FIG. 11 is a block diagram of the apparatus of FIG. 10.

Next, weight measuring unit 1 of apparatus A, in accordance with a modified embodiment of the invention, will be described below with reference to FIGS. 10 and 11.

Since the housing of apparatus A is identical to that in the foregoing embodiment, repeated description thereof will be omitted. This embodiment of the invention consists of apparatus A, equipped with one or more weight measuring sections besides weight measuring section 10.

In this embodiment, there is provided an additional weight measuring section 15, located by the side of main weight measuring weight 10, and another weight measuring section 16 is also located by the side of printing and labelling unit 30.

Weight measuring section 15 is identified by a scale having a weighing scope which is larger than that of main weight measuring section 10, whereas in weight measuring section 16, the same scale as in main weight measuring section 10 is put in use.

Both weight measuring sections 15 and 16, as well as main weight measuring section 10, are connected to control mechanism 22 via switching circuit 60. Any one of weight measuring sections 10, 15, or 16 is connected to control mechanism 22 by means of switching device 60', which is adapted to actuate switching circuit 60.

Switching device 60' essentially comprises a main weight measuring key 61, a second weight measuring key 62, and a third weight measuring key 63, each of which is arranged in input control section 20; by depressing any one of keys 61, 62, and 63, the weight measuring section allocated thereto is connected to control mechanism 22 via switching circuit 60.

Further, input control section 20 is equipped with weight measuring key 64, label preparing key 65, and label sticking key 66, each of which is connected to control section 223 of control mechanism 22. Keys 64, 65, and 66 handle the operation and function of weight measuring sections 15 and 16, storage section 222 in control mechanism 22, and printing and labelling unit 30, by way of control section 20. Keys 64, 65, and 66 may be replaced with switches.

Specifically, when turning on weight measuring key 64, weight measuring sections 15 and 16 perform only the operational steps of measuring the weight of the commodity concerned and displaying, on display section 26, a computed selling price, while storing commodity data and keeping the operation of printing and labelling unit 30 in a prohibited condition; when turning on label preparing key 65, commodity data are stored and printing and labelling unit 30 performs the operations of label printing and displacement of the printed label; and furthermore, when turning on label sticking key 66, printing and labelling unit 30 performs the automatic sticking operation by which printed label 110 is adhesively stuck on packed commodity 100'.

Several examples of the operation of weight measuring sections 15 and 16 will be described as follows.

(1) In the case where commodity 100 is merely weight measured:

The second or third weight measuring keys 62 or 63 of switching device 60 is turned on, and at the same time weight measuring key 64 is also turned on. Thereafter, weight measuring is performed with commodity 100 placed on weight measuring section 15 or 16. In this case, packing section a and printing and labelling section 30 do not work.

(2) In the case where the commodity 100 has a weight in excess of the weighing range of the main weight measuring section:

The second weight measuring key 62 in switching device 60 is turned on, and at the same time label sticking key 66 is also turned on. Thereafter, weight measuring is performed with commodity 100 placed on weight measuring section 15.

In this case, commodity 100 is automatically conveyed onto inlet passage b, automatically packed in packing section a, and the printed label is finally adhesively stuck onto packed commodity 100' along outlet passage b'.

(3) In the case where no packing is effected, due to the fact that commodity 100 has a weight in excess of the packing limit, or in the case where no packing is required:

The third weight measuring key 63 in switching device 60' is turned on, and at the same time label preparing key 65 is turned on also. Thereafter, weight measuring is performed with commodity 100 placed on weight measuring section 16, label printing and preparing are then performed by printing and labelling unit 30, and printed label 110 is finally manually stuck onto commodity 100 by the operator.

Further, when label sticking key 66 is turned on instead of label preparing key 65, commodity 100 is weight measured at weight measuring section 16 and then displaced onto outlet passage b', and the prepared label is automatically stuck onto packed commodity 100' by means of label sticking device 34.

Figure 12:
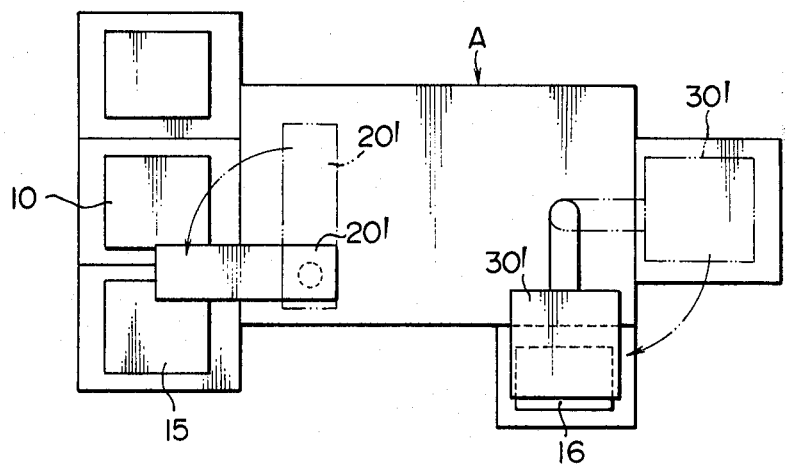
FIG. 12 is a plan view of the apparatus in which the switching means is constructed in accordance with another embodiment of the invention.
Figure 13:
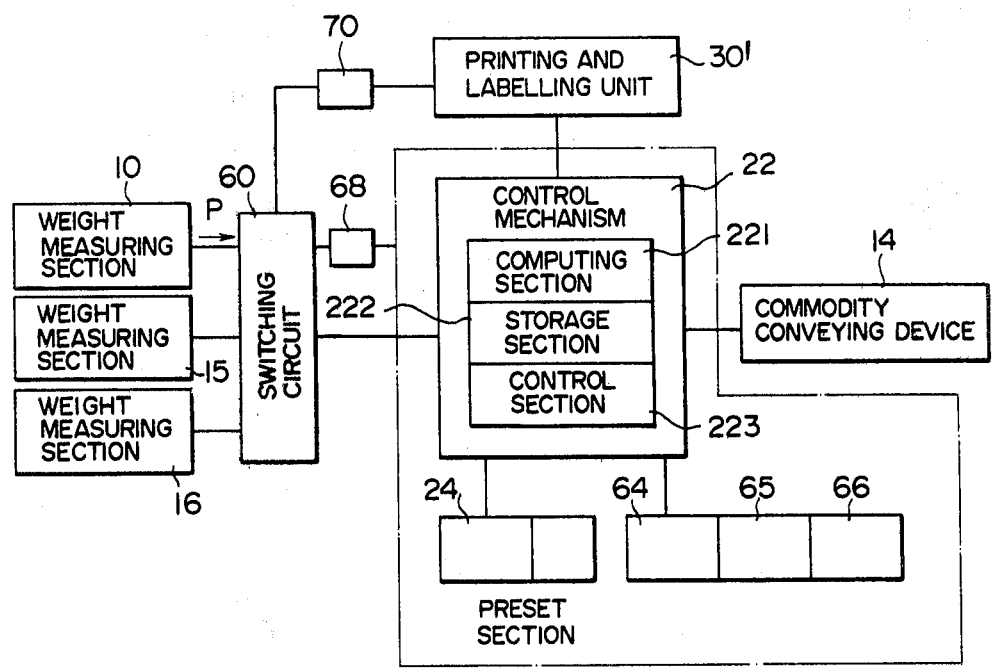
FIG. 13 is a block diagram of the apparatus of FIG. 12.

FIGS. 12 and 13 illustrate the switching device in accordance with another modified embodiment. In this embodiment, input control section 20' and printing and labelling unit 30' are constructed in such a way that they swing through a certain angle and are further provided with switching devices 68 and 70, which are adapted to be turned on or off by their swinging movement.

Switching device 68 is such that, when input control section 20' is swingably moved, only weight measuring section 15 is connected to control mechanism 22 via switching circuit 60. Switching device 70 is such that, when printing and labelling unit 30 is swingably moved, only weight measuring section 16 is connected to control mechanism 22 via switching circuit 60. Weight measuring key 64, label preparing key 65, and label sticking key 66 may be motivated by swinging movement of both input control section 20' and printing and labelling unit 30'.

Instead of the above-described arrangement of switching device 60', switching circuit 60 may be such that the order of priority is previously given to respective weight measuring sections 10, 15, and 16; when input is received from the plural weight measuring sections at the same time, output data are inputted into control mechanism 22, preferably from the weight measuring section having the higher grade, in accordance with the order of priority.

Referring again to FIGS. 11 and 13, tare weight measuring switch 27, totalling memory 224, detectors 42 and 44, and other elements are shown in the same manner as in FIG. 3, although some of the other elements have been omitted from these drawings.

Weight measuring unit 10, in accordance with the above-described modified embodiment, has advantageous features, in that any commodity having a weight which cannot be measured with apparatus A in accordance with the foregoing embodiment will be weighed by means of another weighing section, price computed, and then packed, and any commodity having dimensions in excess of the packing limit or not requiring for packing will be price computed without any accompanying packing operation, or will be merely weight measured. Thus, increased versatility and improved operational productivity are ensured for the price computing and packing apparatus of the invention.

Next, FIGS. 14–17 illustrate an improved label sticking means comprising printing and labelling unit 30. Specifically, height detecting means 120 is arranged along outlet passage b' of apparatus A so that the height of packed commodity 100' is measured relative to an inspection reference face, and thereafter the measured height is converted into an electrical signal. Then, a command is issued from control mechanism 22 in accordance with the electrical signal to displace printing and labelling unit 30 in an upward or downward direction by means of unit adjusting means 130, whereby the open distance between the lower part of printing and labelling unit 30, and the upper surface of packed commodity 100', is selectively adjusted to a predetermined value.

Figure 14:
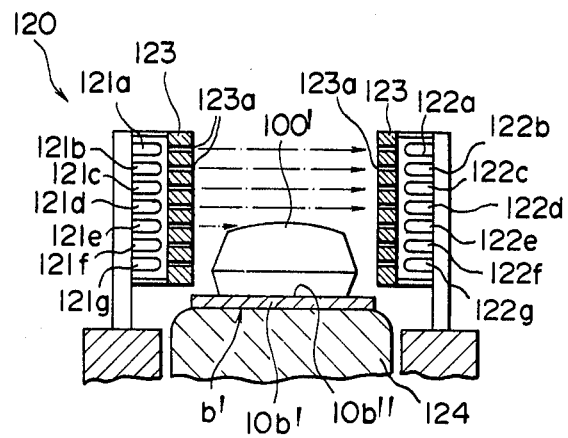
FIG. 14 is a cross-sectional front view of a commodity height detecting means located along an outlet passage of the apparatus.
Figure 15:
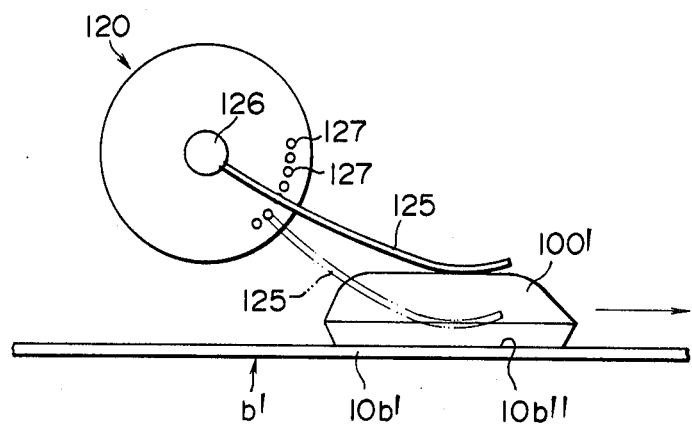
FIG. 15 is a side view of commodity height detecting means in accordance with a modified embodiment of the invention.

FIGS. 14 and 15 illustrate height detecting means 120 in accordance with the first and second embodiments.

Height detecting means 120 in FIG. 14 essentially comprises a plurality of light transmitting elements 121a–121g and a plurality of light receiving elements 122a–122g disposed on both sides of belt conveyor 10b' along outlet passage b', the light transmitting and receiving elements being located opposite to one another and the respective elements being arranged one above another at a right angle to the surface of outlet passage b' (in the vertical direction). Further, they are arranged such that one light transmitting element is allocated to one light receiving element, wherein slit plates 123, having a number of slits 123a formed thereon, are located just in front of the light transmitting and receiving elements so that, e.g., light from light transmitting element 121a is received only by corresponding light receiving element 122a. Outlet passage conveyor 10b', located in the vicinity of light transmitting elements 121a–121g and light receiving elements 122a–122g, serves as a first reference face 10b'' on which the height of commodity 100', which is slidably supported on stationary base 124, is detected. Further, light receiving elements 122a–122g are connected to control mechanism 22 so that the existence of the received light is discriminated, and thereafter the height of packed commodity 100' is calculated relative to first reference face 10b''.

In another embodiment, height detecting means 120 in FIG. 15 essentially comprises contact piece 125 and detecting element 127. Contact piece 125 comes into contact with packed commodity 100', which is conveyed on belt conveyor 10b' in the direction indicated by the arrow mark, while detecting element 127 (an optical element, magnetically-operated approach sensor, or the like, which is preferably kept away from direct contact with contact piece 125) is adapted to detect the rotation angle of contact piece 125 about axle 126, so that the height of packed commodity 100' relative to first reference face 10b'' is measured by an electrical signal.

Figure 16:
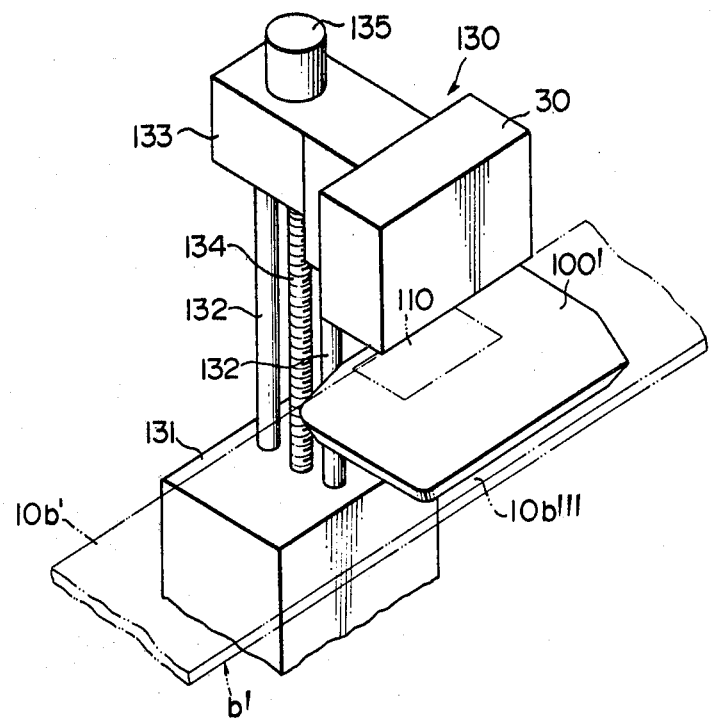
FIG. 16 is a perspective view of a unit adjustment means.

FIG. 16 illustrates unit adjusting means 130 in accordance with the first embodiment. In order that the open distance between packed commodity 100' and printing and labelling unit 30 is adjusted to a preset value (which is a normally open distance between the tip end of sticking nozzle 41 and the upper surface of packed commodity 100', sticking nozzle 41 blowing an air stream for the purpose of sticking printing label 110), unit adjusting means 130 is provided with movable frame 133, which is movably supported by guide shafts 132, which stand upright on base 131. Movable frame 133 contains screw shaft 134, the upper end of which is rotatably held therein in such a manner as not to move in an axial direction, and the lower end of which is received in a threaded hole in base 131. Further, the arrangement is made such that rotation of a step motor fixedly secured to movable frame 133 is transmitted to screw shaft 134, and movable frame 133 is fitted with printing and labelling unit 30 in such a manner that the bottom surface of the latter is located opposite to the second reference face 10b''' (the surface of belt conveyor 10b' in FIG. 16) relative to belt conveyor 10b'.

Figure 17:
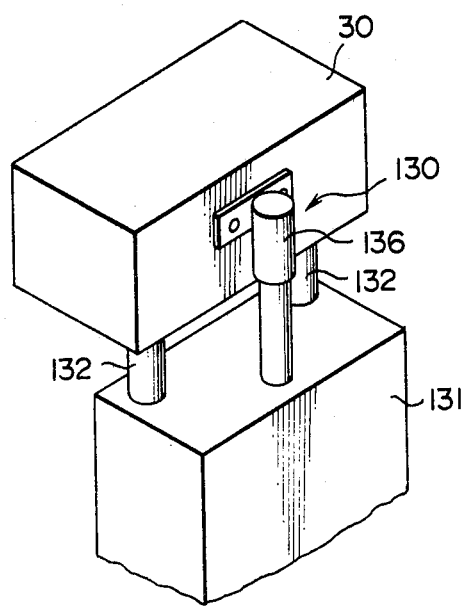
FIG. 17 is a perspective view of the unit adjustment means of FIG. 16 in accordance with a modified embodiment of the invention.

Next, FIG. 17 illustrates a second embodiment of unit adjusting means 130. In this embodiment, pressure cylinder mechanism 136 (which is either hydraulically or pneumatically operated) is arranged between base 131 and printing and labelling unit 30, and is mounted and movable vertically above base 131 with the aid of guide shaft 132. On receipt of a command from control mechanism 22, pressure cylinder 136 becomes effective in displacing printing and labelling unit 30 in the vertical direction such that the position of the latter is self-detected in the manner similar to the function of height detecting means 120, which is operated optically, or with the aid of the step number of a step motor. The self-detecting means of printing and labelling unit 30, as described above, may be applied to the first embodiment, shown in FIG. 16. The displacement of printing and labelling unit 30 may be steplessly adjusted, or adjusted stepwise.

Thus, the height of packed commodity 100', conveyed on outlet passage b' by means of belt conveyor 10b', is automatically measured with the use of height detecting means 120, and the measurement signal is delivered to control mechanism 22 to be temporarily stored therein. The measurement signal is then transferred to unit adjusting means 130, so that, in the first embodiment in FIG. 16, step motor 135 rotates over a required angle in such a manner that the open distance between printing and labelling unit 30 and second reference face 10b'' is set to the combined dimension of the height of packed commodity 100', plus the normal open distance for printing and labelling unit 30. Further, in the second embodiment of FIG. 17, printing and labelling unit 30 is displaced in the vertical direction by means of pressure cylinder 136, so as to determine the open distance between unit 30 and second reference face 10b''', and the result of the position detection for printing and labelling unit 30 is suitably checked by means of the control mechanism and, if it is not satisfactory, corrective operation is repeatedly performed until the required correct open distance is achieved.

As packed commodity 100' is displaced into position between second reference face 10b''' and printing and labelling unit 30, it is detected by means of commodity detector 44 in the above-described manner, whereby label sticking device 34 in printing and labelling unit 30 is operated to adhesively stick printed label 110 onto packed commodity 100'.

Therefore, it is ensured in accordance with the label sticking system as described above that label sticking is performed with the open distance between printing and labelling unit 30 and packed commodity 100' maintained at a predetermined amount at all times, irrespective of any change in height of the packed commodities; stabilized sticking force is achieved without any danger of dislocating a commodity 100' to be labelled; and continuous operation is effected without any interruption of the conveyance of packed commodities (operation may be, of course, effected with an interruption of conveyance of packed commodities).

Figure 18:
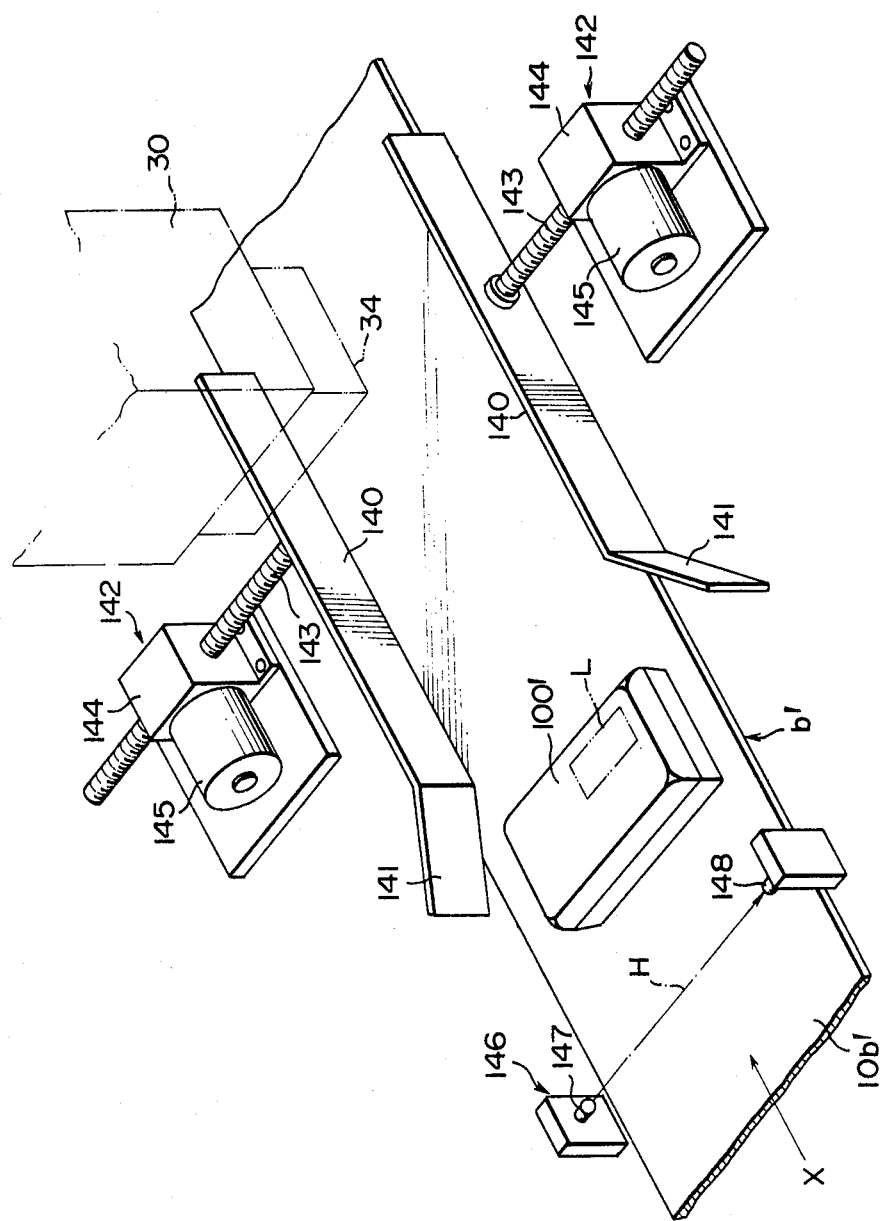
FIG. 18 is a perspective view of an improved labelling means.

Next, FIG. 18 illustrates an improved label sticking means disposed on outlet passage b'. As is apparent from FIG. 18, along both sides of belt conveyor 10b' running along outlet passage b', a pair of guide plates 140 are located which are intended to locate packed commodities 100' in the transverse direction. Guide plates 140 extend to the area below printing and labelling unit 30 in the longitudinal direction, while facing one another in the opposite relation. Guide plates 140 are formed with inclined guide faces 141 at their upstream end, that is, at their front end, as seen from conveying direction x of packed commodity 100'. Guide faces 141 extend divergently outwardly, so that conveyed commodity 100' is displaced and located in the required position by sliding on conveyor 10b', which is caused by a kind of "wedge" effect.

Further, locating devices 142 are arranged outside guide plates 140; the devices are adapted to displace the guide plates 140 in the transverse direction relative to belt conveyor 10b'. *Locating devices 142 essentially comprise screw shaft 143, having a forward end connected to guide plate 140; screw driving mechanism 144, for driving screw shaft 143 in the axial direction; and step motor 145, for rotating screw driving mechanism 144, and controlled by the control section in the housing of the apparatus.*

A commodity detector 146 is located upstream of printing and labelling unit 30, and detects packed commodity 100' passing therethrough.

Commodity detector 146 comprises light-transmitting element 147 and light-receiving element 148, both of which protrude toward belt conveyor 10b'. Detector 146 is operated such that a light beam H from light-transmitting element 147 is interrupted by packed commodity 100', and this is detected by means of light-receiving element 148, whereby the latter outputs commodity detecting signal $P_3'$ to control mechanism 22.

On receipt of commodity detecting signal $P_3'$, control mechanism 22 outputs operating signal $Q_2$ from control section 223 to storage section 222 to transfer the commodity data from storage section 222 to printing section 32, while it outputs operating signal $Q_3$ to printing section 32 to perform the printing operation on the basis of the transferred data.

In the meantime, control mechanism 22 inputs commodity detecting signal $P_3'$, and after a predetermined period of time elapses (the period of time being predetermined by means of a timer in the control section), it outputs operating signals $Q_3'$ from control section 223 to label sticking section 34 to motivate the label sticking section. The output timing of operating signal $Q_3'$ is predetermined by the timer and is defined as the period of time that elapses before packed commodity 100' is conveyed to the area beneath label sticking device 34 by conveyor 10b', after detection at commodity detector 146.

Thus, commodity detector 146 is an improvement of commodity detector 44, particularly in regard to its location. Specifically, improved commodity detector 146 performs commodity detection at a position upstream of printing and labelling unit 30 in order to motivate printing section 32, so that printed label 110 is prepared and held below label sticking device 34, and when packed commodity 100' reaches label sticking device 34, the intended label sticking operation is performed. The arrangement of commodity detector 146 in this way makes it possible to carry out label sticking, as well as automatic label sticking, without any interruption of packed commodities 100'.

Referring to FIG. 18 again, both step motors 145 are operated to adjust the position of both guide plates 140 in order that label sticking position L will be properly located for the packed commodity and relative to conveyor 10b'.

In case a specific commodity code number has previously been stored in control mechanism 22, the data concerning the relation among length, width, and height of the commodity, and the labelling position of label sticking device 34 in printing and labelling unit 30 (corresponding to the specific commodity code number) are issued from the control section in the form of a command. Thus, adjustments are effected separately for both guide plates 140, by operating step motors 145 over the required angle and then by displacing guide plates 140 in the transverse direction relative to belt conveyor 10b'. Alternatively, both step motors 145 may be separately operated such that label sticking location L is aligned with the front end of label sticking device 34, while belt conveyor 10b' is brought to a standstill.

After packed commodity 100' is conveyed on belt conveyor 10b' and detected by commodity detector 146, label 110, with the required data concerning the commodity printed thereon by printing section 32 in printing and labelling unit 30, is prepared and held by label sticking device 34 in the abovementioned manner. Then, after a predetermined period of time elapses after commodity detection, label sticking device 34 is operated to stick label 110 onto label sticking location L of packed commodity 100'.

During the period of time predetermined by means of the timer, packed commodity 100' is conveyed to a location, as illustrated in the drawing. If packed commodity 100' is dislocated in the transverse direction relative to belt conveyor 10b', its corner part comes into contact with one of the inclined guide faces 141 of guide plates 140; thereby, corrective operation is effected, so as to allow it to pass between both guide plates 140, and it is located therebetween such that its longitudinal direction extends at a right angle to conveying direction x, while it is brought in contact with the parallel faces of guide plates 140.

In the foregoing embodiment, the label printing time is defined as a time when commodity detecting signal $P_3'$ is outputted from commodity detector 146, and operating signals $Q_2$ and $Q_3$ are outputted from control section 223. Alternatively, the label printing time may occur when weight measuring signal P is outputted in the above-described manner.

In cases where displacement and location of guide plate 140 need to be exactly adjusted, step motor 145 may be replaced with a conventional electric motor or hydraulic cylinder. Further, detector 146, for detecting packed commodity 100', may be integrally secured to guide plate 140.

Accordingly, the apparatus in accordance with the embodiment illustrated in FIG. 18 ensures that a printed label is precisely stuck onto the packed commodity in the intended labelling position, and the labelling operation is performed with packed commodities continuously conveyed, while both the guide plates are located in a predetermined position. As a result, increased labelling efficiency is achieved.

Next, FIG. 19 illustrates a label sticking means in accordance with a modified embodiment which is very similar to that of FIG. 18.

As illustrated in FIG. 19, commodity detector 146 comprises essentially a light-transmitting element 147 and a light-receiving element 148, which are arranged on guide plates 140. Further, guide plate locating devices 142 contain base board 150, which is displaceably supported on rails 151 in parallel fashion to belt conveyor 10b'. Base board 150 contains feed screw 152, the front end of which is connected to base board 150. Feed screw 152 is operatively supported by means of screw driving mechanism 153 such that it is displaceable over a certain distance by sound step motor 154. Thus, guide plates 140 are adjustably arranged in the longitudinal and trnsverse directions relative to belt conveyor 10b'.

In FIG. 19, guide plates 140 are provided with stoppers 155 at the downstream end in the vicinity of printing and labelling unit 30. Stopper 155 is adapted to protrude above belt conveyor 10b'.

Stopper 155 is constructed such that plunger 157 is protruded inwardly by solenoid 156, which is located outside of guide plate 140 for temporarily interrupting the movement of the commodity by engaging the front end of packed commodity of 100' thereagainst.

Solenoid 156 of stopper 155 is connected to commodity detector 146. As it outputs detecting signal $P_3'$, solenoid 156 is energized, and plunger 157 protrudes inwardly of guide plate 140. As a result, packed commodity 100' comes to a temporary stop.

Further, on receipt of the output of commodity detecting signal $P_3'$, label sticking device 34 of printing and labelling unit 30 performs the label sticking operation. On receipt of the label sticking operation completion signal, solenoid 156 of stopper 155 is released, so that plunger 157 is restored to its original state by a resilient spring contained in plunger 157. Thus, packed commodity 100' is ready to be conveyed again.

Stopper 155 may be operated by a pneumatic cylinder instead of by solenoid 156. Where displacement and location of guide plates 140 and base plates 150 need to be exactly adjusted, they may be operated by a conventional electrical motor or hydraulic cylinder.

Since the arrangement in FIG. 19 allows the position of the packed commodity to be corrected by way of the contact of packed commodity 100' against guide plate 140, and the packed commodity to come to a temporary stop due to the engagement of stopper 155, the label sticking operation is performed at the required, correct position on the packed commodity.

What is claimed is:

1. A weight measuring, price computing and packing apparatus for a commodity comprising:
   (a) a packing section for automatically packing said commodity;
   (b) an inlet passage located upstream of said packing section;
   (c) an outlet passage located downstream of said packing section;
   (d) a weight measuring unit located along said inlet passage for measuring the weight of said commodity, said weight measuring unit comprising a main weight measuring section and an input control section;
   (e) a printing and labelling unit located along said outlet passage for printing a label and sticking said label on said packed commodity, said printing and labelling unit having a printing section and a label sticking section, said printing section including means for printing necessary data on said label and for thereafter transferring said printed label to said label sticking section, said label sticking section comprising means for automatically sticking a printed label to said packed commodity;
   (f) a mechanism for controlling the printing operation in accordance with input data delivered from said weight measuring unit to said printing and labelling unit; and
   (g) a commodity height detecting means and a commodity adjusting means, wherein said weight measuring unit and said printing and labelling unit are connected by a control mechanism.

2. The apparatus as defined by claim 1 wherein guide plates are arranged along said outlet passage in order to position said packed commodity in a transverse direction relative to the outlet passage.

3. The apparatus as defined in claim 1 wherein said inlet and outlet passages both comprise conveyor belts.

4. The apparatus as defined by claim 1 further comprising conveying means for moving the commodity through said apparatus, said conveying means comprising conveyor belts.

5. The apparatus as defined by claim 1 wherein said printing and labelling unit includes an adhesive label-sticking device which is vertically adjustable, and which includes a suction surface and an air jet nozzle.

6. The apparatus as defined by claim 1 wherein said control mechanism comprises means for receiving a signal from said weight measuring unit and for controlling data transfer from said storage section to said printing section and operation of said printing section in accordance with the signal received.

7. The apparatus as defined by claim 6 wherein the signal received comprises either a weight measuring stabilizing signal or a completion of computing operations signals.

8. The apparatus as defined by claim 1 further comprising a mechanical conveying means for conveying a weighed commodity from said inlet passage to said packing section, said mechanical conveying means operating in accordance with the commodity weight as determined by said weight measuring unit.

9. The apparatus as defined by claim 8 wherein said mechanical conveying means is activated by said control mechanism in accordance with a signal generated by said weight measuring section.

10. The apparatus in accordance with claim 1 further comprising at least one additional weight measuring section and switching means for activating either said main weight measuring section or said additional weight measuring section.

11. The apparatus as defined by claim 10 wherein said additional weight measuring sections are located adjacent to said main weight measuring section and said printing and labelling unit.

12. The apparatus as defined by claim 10 wherein said switching means is located at either the input control section of said control mechanism or at a mounting base of said printing and labelling unit.

13. The apparatus as defined by claim 10 wherein said weight measuring sections are switched by swinging or displacing said swinging means.

14. The apparatus as defined by claim 1 wherein said height detecting means detects the height of said commodity relative to a reference surface along said outlet passage and converts said height into an electrical signal.

15. The apparatus as defined by claim 14 wherein said height detecting means comprises a contact element and a detecting sensor.

16. The apparatus as defined by claim 14 wherein said height detecting means comprises light-transmitting elements and light-receiving elements positioned on opposite sides of a conveyor belt used to convey said commodity through said apparatus.

17. The apparatus as defined by claim 14 wherein said commodity height adjusting means comprises a step motor adapted to drive a movable frame having the printing and labelling unit thereon.

18. The apparatus as defined by claim 14 wherein said commodity height adjusting means comprises a vertically-mounted fluid pressure cylinder.

19. The apparatus as defined by claim 14 wherein said adjusting means is electrically controlled by said control mechanism in accordance with receipt of said electrical signal by said control mechanism and from said height detecting means.

20. The apparatus as defined by claim 19 wherein said adjusting means adjusts the open distance between said packed commodity and said label sticking device in accordance with a command signal generated by said control mechanism.

21. The apparatus as defined by claim 1 wherein a commodity detector is located adjacent to said label sticking section for detecting the presence of a packed commodity conveyed along said outlet passage and for transmitting a commodity detecting signal when such presence is detected.

22. The apparatus as defined by claim 21 wherein said label sticking section is controlled by said commodity detecting signal.

23. The apparatus as defined by claim 1 wherein said commodity detector comprises a photoelectric system having a light-transmitting element and a light-receiving element.

24. The apparatus as defined by claim 21 wherein said control mechanism comprises means for receiving said commodity detecting signal and for controlling data transfer from said storage section and operation of said printing and labelling unit in accordance with said commodity detecting signal.

25. The apparatus as defined by claim 24 wherein said commodity detector is located below said label sticking section.

26. The apparatus as defined by claim 21 wherein said control mechanism includes a totalling memory for adding said data to be printed, and which is controlled by said commodity detecting signal.

27. The apparatus as defined by claim 26 wherein said label sticking section of said printing and labelling unit includes a label detector for detecting the presence of a printed label and for generating a label detecting signal to indicate such label presence, said totalling memory being additionally controlled by said label detecting signal.

28. The apparatus as defined by claim 1 wherein said input control section comprises means for receiving said necessary data concerning said commodity.

29. The apparatus as defined by claim 28 wherein said control mechanism comprises a computing section, a storage section, and a control section, said sections comprising means for computing the price of said weighed commodity, storing said computed price together with data received from said receiving means, and for transferring said computed price and said data to said printing section at a time determined by said control section, said control mechanism adapted to control operation of said printing and labelling unit.

30. The apparatus as defined by claim 28 wherein said necessary data includes the measured weight of said commodity, unit price, price of said commodity, date of processing, date of availability, tare weight, commodity name, and bar code.

31. The apparatus as defined by claim 28 wherein said input control section comprises a commodity name input means for inputting additional data to be printed into said printing section.

32. The aparatus as defined by claim 31 wherein said commodity name input means further comprises operating keys arranged on said receiving means.

33. The apparatus as defined by claim 31 wherein said commodity name input means comprises a commodity name cassette to be removably inserted into said input control section, and a detecting mechanism for optically reading said commodity name and transmitting said name in the form of a signal to said printing section.

34. The apparatus as defined by claim 33 further comprising a film pattern reading mechanism for reading the commodity name from said cassette, said film pattern reading mechanism comprising a light source and a photoelectric converter.

35. A weight measuring, price computing and packing apparatus for a commodity comprising:
(a) a packing section for automatically packing said commodity;
(b) an inlet passage located upstream of said packing section;
(c) an outlet passage located downstream of said package section wherein guide plates are arranged along said outlet passage in order to position said packed commodity in a transverse direction relative to said outlet passage, said guide plates comprising at least one pair of elongated plates arranged in transversely spaced relation along said outlet passage;
(d) a weight measuring unit located along said inlet passage for measuring the weight of said commodity, said weight measuring unit compising a main weight measuring section and an input control section;
(e) a printing and labelling unit located along said outlet passage for printing a label and sticking said label on said packed commodity, said printing and labelling unit having a printing section and a label sticking section, said printing section including means for printing necessary data on said label and for thereafter transferring said printed label to said label sticking section, said sticking section comprising means for automatically sticking a printed label to said packed commodity; and
(f) a mechanism for controlling the printing operation in accordance with input data delivered from said weight measuring unit to said printing and labelling unit, wherein said weight measuring unit and said printing and labelling unit are connected by a control mechanism.

36. The apparatus as defined by claim 35 further comprising means for adjusting the distance between each pair of elongated plates in a direction transverse to said outlet passage.

37. The apparatus as defined by claim 36 wherein a commodity detector is arranged upstream of said label sticking device for detecting the presence of said packed commodity and for thereafter generating a signal for operating said label sticking device at a predetermined time.

38. The apparatus as defined by claim 37 further comprising a timer for controlling said predetermined period of time.

39. The apparatus as defined by claim 37 wherein at least one stopper is disposed adjacent to said guide plates and is adapted to contact the front end of said packed commodity to temporarily stop said packed commodity and wherein a second commodity detector is disposed adjacent to said stopper to detect the presence of said packed commodity, said second detector being adapted to operate said label sticking device.

40. The apparatus as defined by claim 39 wherein said at least one stopper is movable between a position in which it protrudes beyond said outlet passage to temporarily stop a packed commodity and a retracted position, said stopper being positioned in said retracted position after receipt of a label sticking operation completion signal generated by said label sticking section.

41. The apparatus as defined by claim 39 wherein said guide plates comprise at least one pair of elongated plates which are adjustable with respect to the conveying direction of said packed commodity.

42. A weight measuring, price computing and packing apparatus for a commodity comprising:
(a) a packing section for automatically packing said commodity;
(b) an inlet passage located upstream of said packing section;
(c) an outlet passage located downstream of said packing section;
(d) a weight measuring unit located along said inlet passage for measuring the weight of said commodity, wherein said weight measuring unit comprises a main weight measuring section and an input control section;
(e) a printing and labelling unit located along said outlet passage for printing a label and sticking said label on said packed commodity, said printing and labelling unit having a printing section;
(f) a mechanism for controlling the printing operation in accordance with input data delivered from said weight measuring unit to said printing and labelling unit wherein said weight measuring unit and said printing and labelling unit are connected by a control mechanism; and
(g) a mechanical conveying means for conveying a weighed commodity from said inlet passage to said packing section, said mechanical conveying means operating in accordance with the commodity weight as determined by said weight measuring unit, wherein said mechanical conveying means is activated by said control mechanism in accordance with a signal generated by said weight measuring section, said generated signal being either a weight measuring stabilizing signal or a computing operation completion signal.

43. The apparatus as defined by claim 42 wherein said input control section comprises a switch section for preventing any signal generated by said control mechanism from reaching any of said mechanical commodity conveying means, said storage section, or said printing section, irrespective of any signal generated by said weight measuring section.

44. The apparatus as defined by claim 43, said switch section being adapted to operate during measurement of the tare weight of a packed commodity.

45. The apparatus as defined by claim 44 wherein said switch section is automatically released after said weight measuring stabilizing signal is generated and after the tare weight has been subtracted from said packed commodity weight.

46. A weight measuring, price computing and packing apparatus for a commodity comprising:
(a) a packing section for automatically packing said commodity;
(b) an inlet passage located upstream of said packing section;

(c) an outlet passage located downstream of said packing section, wherein guide plates are arranged along said outlet passage in order to position said packed commodity in a transverse direction relative to said outlet passage, said guide plates comprising at least one pair of elongated plates arranged in a transversely spaced relation along said outlet passage;

(d) means for adjusting the distance between each pair of elongated plates in a direction transverse to said outlet passage;

(e) a weight measuring unit located along said inlet passage for measuring the weight of said commodity, the weight measuring unit comprising a main weight measuring section and an input control section;

(f) a printing and labelling unit located along said outlet passage for printing a label and sticking said label on said packed commodity, said printing and labelling unit having a printing section and a label sticking section, said printing section including means for printing necessary data on said label and for thereafter transferring said printing label to said label sticking section, said label sticking section comprising means for automatically sticking a printed label to said packed commodity; and (g) a mechanism for controlling the printing operation in accordance with input data delivered from said weight measuring unit to said printing and labelling unit, wherein said weight measuring unit and said printing and labelling unit are connected by a control mechanism, wherein a commodity detector is arranged upstream of said label sticking device for detecting the presence of said packed commodity and for thereafter generating a signal for operating said label sticking device at a predetermined time, wherein at least one stopper is disposed adjacent to said guide plates and is adapted to contact the front end of said packed commodity to temporarily stop said packed commodity and wherein a second commodity detector is disposed adjacent to said stopper to detect the presence of said packed commodity, said second detector being adapted to operate said label sticking device, wherein said at least one stopper is movable between a position in which it protrudes beyond said outlet passage to temporarily stop a packed commodity in a retracted position, said stopper being positioned in said retracted position after receipt of a label sticking operation completion signal generated by said label sticking section, and wherein each said stopper comprises a spring-biased plunger and a solenoid adapted to temporarily interrupt movement of said commodity through said apparatus.

* * * * *

UNITED STATES PATENT AND TRADEMARK OFFICE
CERTIFICATE OF CORRECTION

PATENT NO. : 4,415,048

DATED : November 15, 1983

INVENTOR(S) : Kazuharu TERAOKA

It is certified that error appears in the above-identified patent and that said Letters Patent is hereby corrected as shown below:

In Column 1, line 18, delete "data" and substitute ---date--- therefor.

In Column 20, line 2, "trnsverse" should read ---transverse---.

In Column 21, line 51, delete "swinging" and substitute ---switching--- therefor.

Signed and Sealed this

Fifth Day of June 1984

[SEAL]

Attest:

Attesting Officer

GERALD J. MOSSINGHOFF

Commissioner of Patents and Trademarks